Aug. 14, 1945.    J. F. LOUGHLIN    2,382,890
PROCESS OF SEPARATING AND RECOVERING CONSTITUENTS OF TALL OIL
Filed Aug. 1, 1942
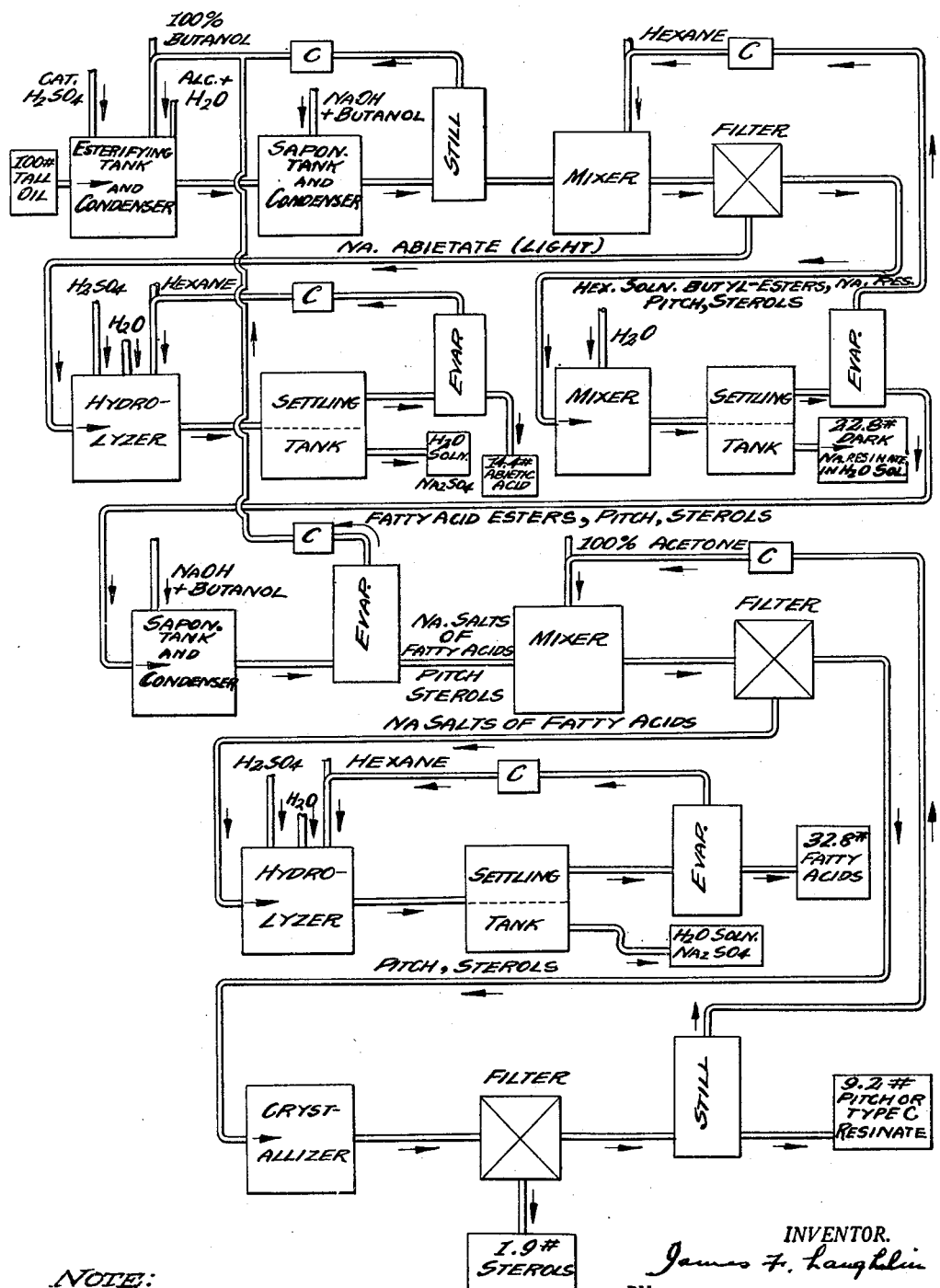
NOTE:
THE SYMBOL # INDICATES PARTS BY WEIGHT.
INVENTOR.
James F. Loughlin
BY
H. Lee Helms
ATTORNEY.

Patented Aug. 14, 1945

2,382,890

UNITED STATES PATENT OFFICE 2,382,890

PROCESS OF SEPARATING AND RECOVERING CONSTITUENTS OF TALL OIL

James F. Loughlin, New York, N. Y.

Application August 1, 1942, Serial No. 453,291

8 Claims. (Cl. 260—97.5)

This invention relates to a process of refining tall oil, or other mixtures chiefly of water-insoluble fatty acids, rosin acids and sterols usually found in tall oil.

It is well known in the kraft pulp producing industry that the waste black liquor obtained as a result of cooking coniferous wood contains a considerable amount of crude soap composed chiefly of sodium fatty acid soaps and sodium rosin acid soaps. Upon concentrating this black liquor, this crude kraft soap or tall oil soap, is salted out and rises to the surface along with certain other products such as sterols and pitch. This crude soap may be skimmed off and recovered for further use. It usually contains approximately 25–40% water. By hydrolyzing this crude soap, crude tall oil may be recovered. From this crude tall oil, a more refined tall oil may be produced by different methods such as by high temperature vacuum distillation. Such crude and/or refined tall oil may be used in accordance with this invention for the recovery of much more valuable compounds.

The tall oil is first mixed with normal-butyl alcohol (or any other suitable alcohol) and a small amount of esterifying catalyst such as sulfuric acid and the mixture submitted to esterification for several hours under reflux. I prefer to employ butyl or amyl alcohol rather than methyl, ethyl and propyl alcohols because in the use of the latter it is not only more difficult to complete esterification of the fatty acids but it is more difficult to remove continuously the water of esterification and, furthermore, it is very difficult to separate the several different types of rosin acid sodium salts present when the process has proceeded to a point hereinafter described. I particularly prefer to use n-butyl alcohol because it facilitates the removal continuously of the water of esterification as formed and, furthermore, it facilitates the separation of the different types of rosin acid sodium salts when the process has proceeded to a point hereinafter described.

When the tall oil is thus treated, the fatty acids present are esterified to form alcohol esters such as n-butyl oleate, n-butyl linoleate, n-butyl linolenate, etc., or methyl alcohol esters such as methyl oleate, methyl linoleate, methyl linolenate, etc.

In the esterification the rosin acids are not esterified to alcohol resinates, but remain as rosin acids. Accordingly, separation may readily be effected by adding NaOH (dissolved in butyl alcohol) in sufficient quantity to convert all of the rosin acids and the sulfuric acid to their sodium salts. The excess alcohol present is then distilled off for re-use, by recycling. The fatty acid esters, sterols, together with the rosin acid sodium salts, are led to a mixing vessel and are mixed with a low boiling hydrocarbon such as hexane. The said rosin acid sodium salts are of three types, and for convenience, are hereinafter termed "light sodium abietate," "dark sodium resinate" and "pitch."

In the employment of butyl or amyl alcohols for esterification, a separation may be effected at this point by separating out the light sodium abietate as a precipitant. The remaining solution contains alcohol fatty acids esters, dark sodium resinate, pitch and sterols in hexane solution. This solution is led to a mixing tank and water added whereby two layers may be formed, as in a separate settling tank, the top layer being a hexane solution of fatty acid esters, pitch and sterols, and the lower layer being a water solution of dark sodium resinate. The two layers are separated and the hexane layer is stripped of the solvent and the mixture of fatty acid esters, pitch and sterols is saponified. It will be understood that they will be present with butanol (or amyl alcohol if that alcohol is employed in the esterification).

The alcohol is then stripped, as by evaporation, and the said alcohol-free materials are mixed with anhydrous acetone in order to precipitate the sodium salts of fatty acids and to dissolve the pitch and sterols.

The sodium salts of fatty acids after separation from the acetone solution of pitch and sterols are then dissolved in water and the acetone removed, as by evaporation, and are then hydrolyzed. Thereupon a low boiling hydrocarbon such as hexane is added and the mixture is settled to form two layers, a top layer being a hexane solution of fatty acids and the bottom layer being an aqueous solution of sodium sulfate. The two layers are separated, the hydrocarbon being stripped from the top layer to recover high grade fatty acids.

The light sodium abietate separated by precipitation from hexane solution above described may be recovered as such, by evaporation of the hexane carried thereby and recovered as such. Or it may be hydrolyzed in the presence of water, a low boiling hydrocarbon such as hexane then being added. Two layers are thus formed, a top consisting of a hexane solution of light abietic acid, the latter being stripped of hexane to recover a light abietic acid. If preferred, some of the hexane may be stripped and then crystallization from the residual hexane may be effected to produce substantially pure white abietic acid crystals.

The acetone solution of pitch and sterols remaining after removal of all of the other materials of the tall oil, in the manner described, is chilled to crystalize out the sterols, which are removed by filtering, centrifuging or other suitable means. The remaining solution is stripped of the acetone or other ketone used to recover the pitch or "type C" sodium resinate. This pitch or "type C" sodium resinate will be found to be (1) soluble in acetone; (2) soluble in hexane; (3) insoluble in cold water; (4) emulsifiable in hot water. Its properties make it a desirable product to be used as a carrier for insecticide sprays.

As an example—

Recovery of light sodium abietate 100 parts of tall oil mixed with 100 parts of n-butyl alcohol and 1 part sulfuric acid as a catalyst. The mixture was heated under reflux at a temperature of about 105° C. for a period of about 4 hours. In commercial practice, the water of esterification may be continuously removed as a binary boiling mixture with the n-butyl alcohol vapors. This is done by condensing said butyl alcohol-water vapors, decanting said condensate, and refluxing only the top layer formed in a continuous decanter. The mixture of butyl fatty acid esters and unreacted abietic and rosin acids was then treated with sufficient caustic soda dissolved in butyl alcohol to saponify only the abietic and rosin acids and to neutralize the sulfuric acid catalyst. The excess butyl alcohol was then evaporated from the solution. The solution was then mixed with hexane and filtered to remove the insoluble light sodium abietate which may be recovered as such or subsequently treated as hereinafter described.

Recovery of dark sodium resinate

The hexane solution containing butyl-alcohol fatty acid esters, dark sodium resinate, pitch and sterols was then mixed with water and let settle to form two layers, the bottom layer containing dark sodium resinate in water solution from which 22.8 parts of dark sodium resinate were recovered. It may be hydrolyzed and thus recovered as dark rosin acid.

Recovery of sodium salts of fatty acids

The top layer containing hexane, fatty acid esters, pitch and sterols was separated and the hexane removed by distillation. The remaining fatty acid esters, pitch and sterols were then saponified with caustic soda in the presence of butyl alcohol. The butyl alcohol was then distilled from the mixture leaving the sodium salts of fatty acids, pitch and sterols which were then treated with anhydrous acetone to dissolve the pitch and the sterols from the undissolved sodium salts of fatty acids. These sodium salts of fatty acids were precipitated, to be later treated as hereinafter described.

Recovery of sterols

The solution or filtrate containing pitch and sterols in acetone solution was chilled to crystallize the sterols, the pitch remaining in acetone solution. The crystals were removed by filtration and the filtrate concentrated and further chilled for the recovery of additional crystal sterols. 1.9 parts by weight of sterols were thus recovered.

Recovering of "pitch" or "type C" sodium resinate

The final filtrate was distilled to recover the acetone from the pitch or "type C" sodium resinate. 9.2 parts by weight pitch or type C sodium resinate were recovered in this manner.

Recovery of light abietic acid

The white sodium abietate was dissolved in water, hydrolyzed with sulfuric acid, after which hexane was added to pick up the white abietic acid; two layers were formed on settling, the bottom layer containing sodium sulfate in water solution and the top layer being a hexane solution of white abietic acid; the hexane was stripped from this solution recovering 14.4 parts by weight light abietic acid.

Fatty acids

Sodium salts of fatty acids were dissolved in water, hydrolyzed with sulfuric acid, hexane being added to pick up fatty acids, the mixture allowed to settle, forming two layers, the bottom layer being sodium sulfate in water solution, the top layer being a hexane solution of fatty acids. The hexane was stripped from this solution and 32.8 parts by weight fatty acids were thus recovered.

It has heretofore been pointed out that in the separation of the light sodium abietate from the dark sodium abietate and other constituents, butyl and amyl alcohols are operative. Any of the monohydric alcohols having 4 or more carbon atoms to the molecule, such as butyl, amyl and hexyl alcohols, may be employed. When the lower alcohols, such as methyl, ethyl and propyl alcohols are used, the light and dark sodium abietates will be recovered as a mixture.

Having described my invention, what I claim and desire to secure by Letters Patent, is as follows:

1. A process of separating and recovering constituents of tall oil, which comprises adding monohydric aliphatic alcohols having from 4 to 6 carbon atoms in the molecule to the tall oil and esterifying the fatty acids in the presence of an esterification catalyst, adding a substantially non-aqueous alkaline sodium saponifying agent to the mixture and thereby saponifying the rosin acids, stripping off the excess alcohol, adding a lower boiling point hydrocarbon in the absence of a second organic solvent having a higher boiling point than water to the mixture whereby the constituents are dissolved with the exception of light sodium abietate, and removing the light sodium abietate.

2. A process of separating and recovering constituents of tall oil, which comprises adding monohydric aliphatic alcohols having from 4 to 6 carbon atoms in the molecule to the tall oil and esterifying the fatty acids in the presence of an esterification catalyst, adding a substantially non-aqueous alkaline sodium saponifying agent to the mixture and thereby saponifying the rosin acids, stripping off the excess alcohol, adding a lower boiling point hydrocarbon in the absence of a second organic solvent having a higher boiling point than water to the mixture whereby the constituents are dissolved with the exception of light sodium abietate, separating and hydrolyzing the light sodium abietate, adding a low boiling hydrocarbon thereby forming two layers, a hydrocarbon solvent—abietic acid layer and a water—sodium sulfate layer, removing the first layer and stripping off the hydrocarbon solvent, thereby recovering light abietic acid.

3. A process of separating and recovering constituents of tall oil which comprises adding monohydric aliphatic alcohols having from 4 to 6 carbon atoms in the molecule to the tall oil and esterifying the fatty acids in the presence of an esterification catalyst, adding a substantially non-aqueous alkaline sodium saponifying agent to the mixture and thereby saponifying the rosin acids, adding a lower boiling point hydrocarbon in the absence of a second organic solvent having a higher boiling point than water to the mixture and thereby dissolving the constituents with the exception of light sodium abietate, separating and removing the light sodium abietate, mixing the remaining hydrocarbon solution with water and settling to form two layers, the bottom layer containing dark sodium resinate in water solution, removing said water layer, the same constituting a product for use in fluid form or for use as a solid after evaporation of water.

4. The process of treating tall oil, which comprises adding monohydric aliphatic alcohols having from 4 to 6 carbon atoms in the molecule to the tall oil to esterify the fatty acids, and completing esterification of said fatty acids in the presence of heat and a catalyst, adding an alkaline sodium saponifying agent in the absence of water to saponify rosin acids, stripping off the excess alcohol, adding a lower boiling point hydrocarbon in the absence of a second organic solvent having a higher boiling point than water to the mixture, as a solvent, adding water to the mixture, settling to form two layers, the bottom layer containing the sodium abietate and sodium resinate in water solution and the top layer containing the hydrocarbon solution of fatty acid esters, pitch and sterols, stripping off the hydrocarbon solvent, saponifying the remaining fatty acid esters, pitch and sterols in the presence of a similar monohydric alcohol, stripping off the alcohol and treating the residue materials with acetone to dissolve the pitch and the sterols, the sodium salts of fatty acids being precipitated and removed.

5. A process in accordance with claim 4, comprising the added steps of dissolving the sodium salts of fatty acids in water, hydrolyzing the acid salts, adding a low boiling point hydrocarbon solvent to pick up the fatty acids, settling to form two layers, the top layer being a hydrocarbon solution of fatty acids, and stripping off the hydrocarbon to recover fatty acids.

6. A process of separating and recovering constituents of tall oil which comprises adding monohydric aliphatic alcohols having from 4 to 6 carbon atoms in the molecule to the tall oil to esterify the fatty acids, and completing esterification of said fatty acids in the presence of heat and a catalyst, adding an alkaline sodium saponifying agent effective in the absence of water to saponify rosin acids, stripping off the excess alcohol, adding a lower boiling point hydrocarbon in the absence of a second organic solvent having a higher boiling point than water to the mixture, as a solvent, adding water to the mixture, settling to form two layers, the bottom layer containing the sodium abietate and sodium resinate in water solution and the top layer containing the hydrocarbon solution of fatty acid esters, pitch and sterols, stripping off the hydrocarbon solvent, saponifying the remaining fatty acid esters, pitch and sterols in the presence of a similar monohydric alcohol, stripping off the alcohol and treating the residue materials with acetone to dissolve the pitch and the sterols, the sodium salts of fatty acids being precipitated and removed, chilling the solution of pitch and sterols and thereby crystallizing the sterols, removing the sterols as crystals, and stripping off the solvent from the pitch for the recovery of the latter.

7. A process in accordance with claim 4 in which the light sodium abietate is removed as a precipitant from the hydrocarbon solution containing the fatty acid esters, sodium resinate, pitch and sterols.

8. A process in accordance with claim 4 in combination with the added step of chilling the solution of pitch and sterols and thereby crystallizing the sterols and removing the sterols as crystals.

JAMES F. LOUGHLIN.